United States Patent [19]

Vogel et al.

[11] 4,415,899
[45] Nov. 15, 1983

[54] MONITOR FOR AN INSTRUMENT-LANDING SYSTEM

[75] Inventors: Horst Vogel, Korntal; Horst Idler, Stuttgart; Arno H. Taruttis, Ludwigsburg, all of Fed. Rep. of Germany

[73] Assignee: International Standard Electric Corporation, New York, N.Y.

[21] Appl. No.: 323,216

[22] Filed: Nov. 20, 1981

Related U.S. Application Data

[63] Continuation of Ser. No. 98,807, Nov. 30, 1979, abandoned.

[30] Foreign Application Priority Data

Dec. 5, 1978 [DE] Fed. Rep. of Germany ....... 2852506

[51] Int. Cl.$^3$ .............................................. G01S 1/16
[52] U.S. Cl. .................................................. 343/413
[58] Field of Search .......... 364/447; 343/5 CF, 5 LS, 343/108 R, 107, 5 DP, 5 SA, 109

[56] References Cited

U.S. PATENT DOCUMENTS 3,413,638 11/1968 Trim ................................. 343/108 R
3,671,967 6/1972 Fries ................................. 343/108 R
3,697,997 10/1972 Cooper ........................... 343/108 R

OTHER PUBLICATIONS

Jolliffe et al., "The Character of the Received I.L.S. Signal and Its Relation to Monitoring", Radio & Electronic Engineer, vol. 32, No. 2, Nov. 1966.

Primary Examiner—Maynard R. Wilbur
Assistant Examiner—Robert C. Burk
Attorney, Agent, or Firm—T. E. Kristofferson; W. T. O'Neil

[57] ABSTRACT

A monitor located about 100 m from the ILS localizer determines whether the DDM alarm threshold was exceeded due to an equipment error or to an error caused by an overflying aircraft. To accomplish this, either the maximum of the frequency spectrum of the variation with time of the differentiated DDM signal is located, or the frequency spectrum of the variation with time of the DDM signal or of the differentiated DDM signal is compared with one or a plurality of spectra typical of equipment errors or of errors caused by overflying aircraft.

3 Claims, 4 Drawing Figures

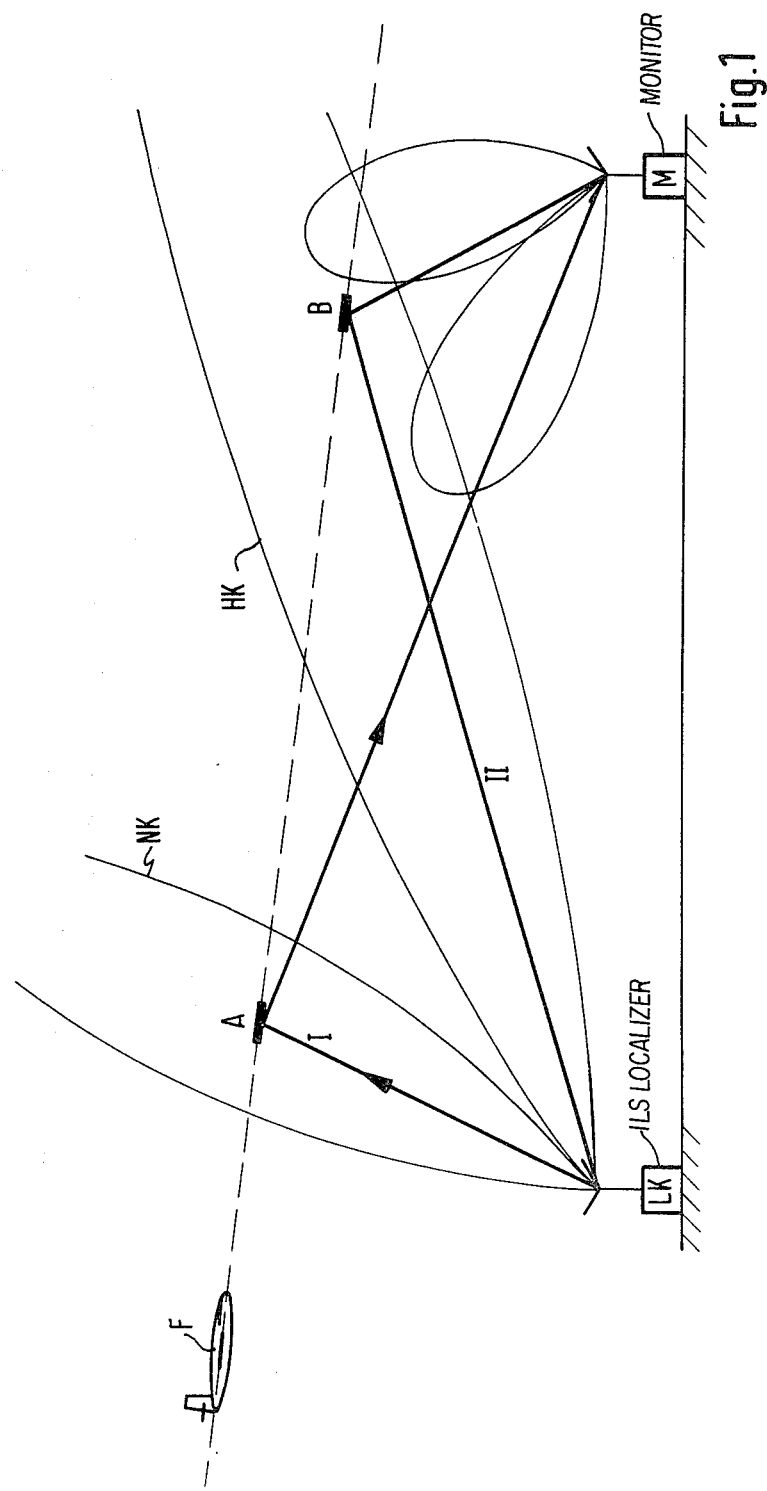

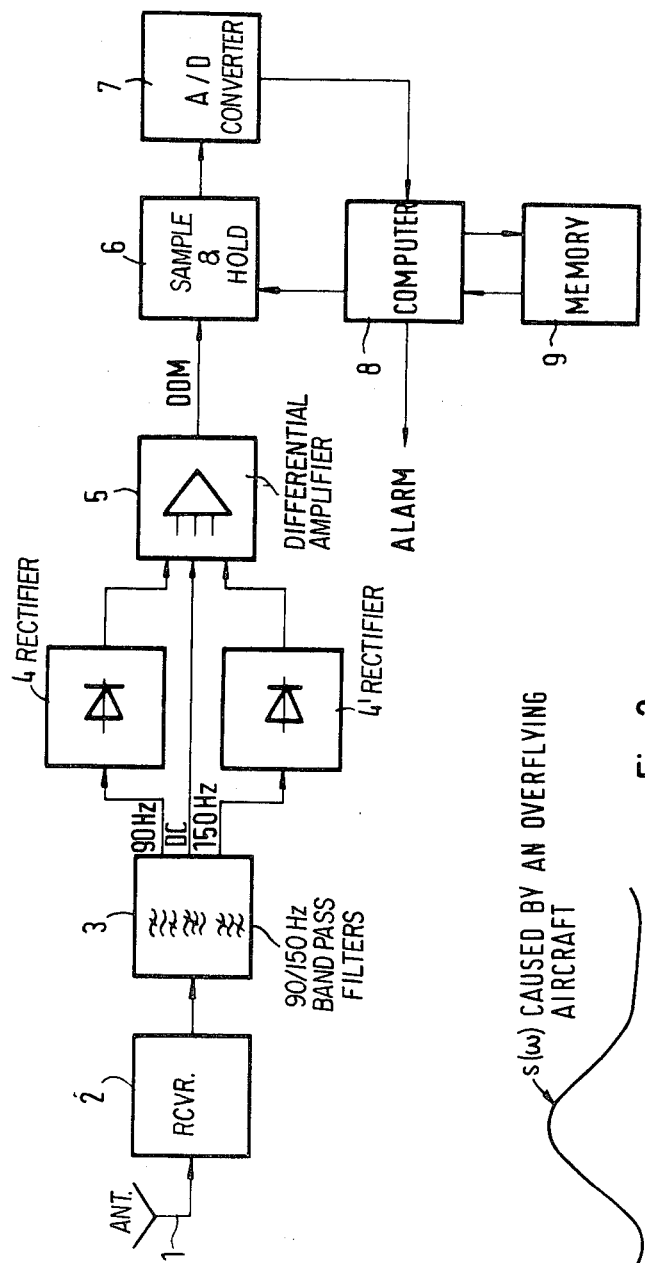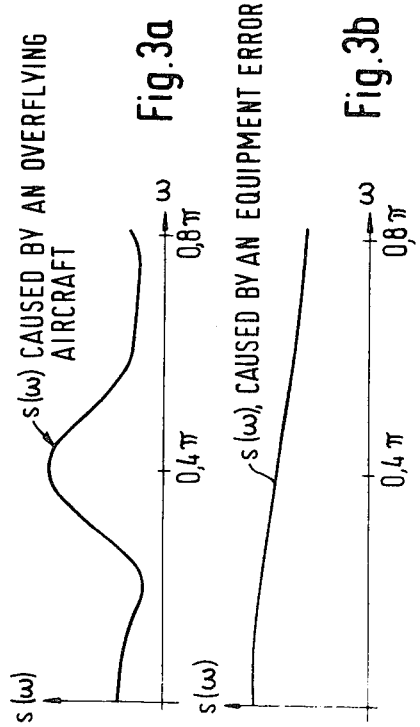

MONITOR FOR AN INSTRUMENT-LANDING SYSTEM

This is a continuation of application Ser. No. 098,807, filed Nov. 30, 1979, now abandoned.

BACKGROUND OF THE INVENTION

The present invention relates to a monitor for the instrument-landing system as set forth in the preamble of claim 1. A monitor of this kind is described in an article by H. Rausch, "Moderne Funk-Landesysteme", 6th Vol., 1974, No. 11, pages 223 to 227.

The radiation of the localizer and glide-path signals is monitored by a monitor located about 100 m from the antenna array. When the tolerances specified by the ICAO (International Civil Aviation Organization) are exceeded in the monitor, an alarm signal is provided which either turns the transmitter off or switches it to a standby transmitter.

The following description will be concerned only with the localizer signals. On the runway center line, the difference in depth of modulation (DDM) between the 90-Hz and 150-Hz patterns of the localizer signal must be zero. Any deviations therefrom, which are detected in the monitor, may be caused both by equipment errors and by overflying aircraft. Since, however, the alarm signals are to be provided only in the presence of equipment errors, it must be determined whether the deviation from the specified DDM value is caused by an overflying aircraft or not. To this end, conventional prior art installations employ a second monitor, e.g., a near-field monitor. The signals received by this monitor are not disturbed by overflying aircraft. Thus, an equipment error is identified only if both monitors indicate an error.

OBJECT

The object of the invention is to design the monitor so that no additional (i.e., no second) monitor is required to determine whether an error was caused by an overflying aircraft.

SOLUTION

This object is achieved by the means set forth in claim 1 or 3. A further development of the solution according to claim 1 is given in claim 2.

ADVANTAGES

The novel monitor determines whether the deviation from the specified DDM waveform is caused by an equipment error or by an overflying aircraft. Additional near-field monitoring is no longer necessary.

DESCRIPTION OF THE INVENTION

The invention will now be explained in greater detail, by way of example, with reference to the accompanying drawings, in which:

FIG. 1 shows the spatial arrangement of a localizer and a monitor and their radiation patterns to explain the error caused by an overflying aircraft;

FIG. 2 is a block diagram of an embodiment; and

FIGS. 3a and 3b show the frequency spectra used for evaluation.

For a localizer LK, a radiation pattern having a main lobe HK and a side lobe NK is shown. For a monitor M, located on the runway center line at a distance of 100 m from the localizer LK, a two-lobe radiation pattern is shown.

A landing aircraft F passes through the side lobe NK and then through the main lobe HK of the radiation pattern of the localizer LK (an aircraft taking off passes through the lobes in reverse order).

The monitor M receives signals arriving from the localizer LK by the direct path, and signals which are reflections of the localizer signals from the landing aircraft. The paths of the reflected signals I, II are shown for two aircraft positions A, B. While the aircraft is flying outside the lobes of the localizer's radiation pattern, no appreciable signals are reflected from the aircraft.

The signal received by the monitor is thus the signal arriving by the direct path, on which signals reflected from the aircraft may be superimposed. From the spatial arrangement of the localizer and the monitor, from the existing radiation patterns, and from the speeds of the landing or departing aircraft, it follows that the amplitude of the sum signal received by the monitor varies. The DDM is determined from the received signal. The DDM values also vary as the above-mentioned sum signal. The invention is based on recognition that it is possible to derive from these variations in an advantageous manner whether the interference is caused by an overflying aircraft or by the equipment.

The evaluation will now be described with the aid of FIG. 2.

The signals received by an antenna 1 are first processed in an RF unit (Receiver) 2. Following demodulation, the navigational components are split up in a filter device 3 by means of 90-Hz and 150-Hz band-pass filters. The filter device provides a d.c. voltage signal as a reference signal to a differential amplifier 5. Following full-wave rectification, 4, 4', of the 90-Hz and the 150-Hz components, the two signal voltages (90 Hz, 150 Hz) are evaluated. This is done in the differential amplifier 5. The output signal of the differential amplifier 5 is the DDM. Since this signal processing is known from the reference cited above, it need not be described in greater detail. The following description relates to the novel evaluation which determines whether deviations from the specified DDM waveform are caused by equipment errors or by overflying aircraft.

The ICAO recommends that in Catagory III systems, a disturbed signal transmitted by the localizer be present not longer than one second after the occurrence of an interference. From this it follows that the measurements of the DDM and the evaluation must be completed within a maximum of 0.8 seconds.

In a sample-and-hold circuit 6 controlled by a computer 8, the DDM is measured at 33-ms fixed time intervals. The computer may be a conventional type. The sample-and-hold circuit may be the device SHM-LM-2 of Datel Systems, Inc., USA. The measured value is converted into a digital value in an analog-to-digital converter 7, and fed to the computer 8. The computer 8 checks whether the DDM exceeds an alarm threshold defined by the ICAO. This check is performed in the computer 8 because the use of a computer for further evaluation is otherwise advantageous.

The variation with time of the DDM, i.e., the DDM as a function of time, is given by $$DDM(t) = m_t + \sum_i a_i \cos\omega_i \cdot t + \sum_i b_i \sin\omega_i \cdot t + Z_t$$

where $m_t$ = d.c. voltage component. If the localizer functions properly, and no overflying aircraft are present, the DDM at the monitor will be zero, i.e., $m_t = 0$. When errors are developing in the localizer, the DDM will change up to a final value. $m_t$ then represents this final value $\neq 0$, which is caused by equipment errors.

$a_i, b_i$ = amplitudes of the low-frequency components of the associated radian frequencies $\omega_i$. This component is caused by overflying aircraft. The values of $f_i$ which are important for evaluation lie between 0 and 12 Hz. $\omega_i$ are the radian frequencies $\omega_i = 2\pi f_i$.

$z_t$ = random components caused by reflections from parts projecting from the aircraft, such as landing gear, engines, etc. They are not used for further evaluation.

When the alarm threshold is exceeded, N (N has been chosen to be 24) values $x_j$ of the curve DDM(t) are sensed at intervals of $\Delta t = 33$ ms, i.e., j lies between 1 and 24.

The alarm threshold will be understood to be as defined by ICAO in units of lineal course line displacement at a reference datum. Such a reference is readily translated to DDM ratios or to voltage or current signals in accordance with scale factors available to the installation technician. In the technical publication entitled "The Character of the Received ILS Signal and its Relation to Monitoring" (The Radio and Electronic Engineer, Nov. 1966), the known criteria for setting the alarm threshold are discussed at length. A typical value in terms of DDM expressed as a signal current is $5\mu A$ as set forth in that paper, which was delivered at the Radar and Navigation Aids Group Symposium on "Monitoring of ILS Ground Equipment for Automatic Landing" (London, Apr. 4, 1966).

Since, as mentioned previously, the low-frequency components $f_i$ are needed for further evaluation—particularly in view of any errors caused by overflying aircraft—, these low-frequency components $f_i$ are filtered from the signal DDM(t). This is done by means of a digital filter which is implemented by the computer 8. This filtering follows the algorithm $$Y_j = \frac{1}{\Delta t}(X_{j+1} - X_j), \text{ where}$$

$\Delta t$ is the fixed time interval (33 ms in this case).

In the following, $\omega = \omega_i \Delta t$ is a normalized radian frequency in the range $0 \leq \omega \leq \pi$.

By this algorithm, not only are the low-frequency components filtered out, but the DDM(t) variation is also differentiated at the same time.

The DDM variation filtered and differentiated according to the above algorithm is regarded as a stationary stochastic process with a determinant whose autocovariance coefficients are given by $$cov_{yy}(K) = C_K = \sum_{j=1}^{N-K} Y_{(j+k)} \cdot Y_j / N$$

where

K = 0, 1, 2, ... N, and
$C_K = 0$ for $K \geq N$, where K is the number of time intervals $\Delta t$ between $Y_j$ and $Y_{j+K}$.

As the accuracy of $C_K$ decreases with increasing values of K, a so-called window function $$(0.5)/\left(1 + \cos\frac{\pi K}{M}\right)$$

is introduced which weights the autocovariance coefficients $C_K$ with decreasing factors and makes them zero for $K \geq M$. The number M is an appropriate limit for the autocovariance coefficients $C_K$ and lies around $\frac{1}{3}$ N.

The continuous frequency spectrum of the differentiated DDM(t) variation is given approximately by $$S(\omega) = \frac{1}{\pi}\left(c_0 + \sum_{K=1}^{M} C_K\left(1 + \cos\frac{\pi K}{M}\right)\cos\frac{\pi i K}{Q}\right)$$

where
$\omega = \pi i/Q$ for $0 \leq i \leq Q$, and
Q is an interpolation aid.

It has turned out that all equipment errors causing bends in the localizer have a frequency spectrum $S(\omega)$ whose maximum amplitude is at $\omega = $ zero. FIG. 3a shows a frequency spectrum $S(\omega)$ caused by overflying aircraft, while FIG. 3b shows a frequency spectrum caused by an equipment error. These spectra do not occur at the same time.

By evaluating the respective calculated spectrum $S(\omega)$ as described in the following, it is determined whether the DDM alarm threshold was exceeded due to an equipment error or to an overflying aircraft.

The absolute values $S(\omega)$ in the range $0 < \omega \leq \pi$ are deducted from the value S(0). If the difference in this range is negative at least once, the cause is an overflying aircraft and not an equipment error.

To summarize: An equipment error is present if the absolute maximum of $S(\omega)$ in the range $0 \leq \omega \leq \pi$ is at $\omega = 0$.

An error was caused by an overflying aircraft if the maximum of $S(\omega)$ in the range $0 \leq \omega \leq \pi$ is at a frequency $\leq \pi$ and $\neq 0$.

Instead of locating the maximum of the spectrum $S(\omega)$, the latter may also be compared with spectra typical of equipment errors or of errors caused by overflying aircraft. These spectra or parts of typical characteristics thereof are stored in a memory 9.

What is claimed is:

1. A monitor for a localizer of an instrument landing system, said localizer being of the type which radiates a pair of beams, one modulated at a first low frequency and the other at a second low frequency, the relative depths of modulation of each of said low frequencies detected in a receiver aboard an aircraft on landing approach providing a measure of the deviation of said aircraft from a desired landing course, said monitor comprising:

first means for receiving the radiations of said localizer and for developing a signal which is a continuous function of the difference in depth of modulation of said first and second low frequencies on said received radiations;

second means for repetitively sampling and differentiating said continuous function to produce a frequency spectrum function $S(\omega)$;

third means responsive to the second means sampled values to identify differences of depth of said modulation in excess of a predetermined threshold;

and fourth means activated by a signal corresponding to an over threshold signal from said third means for determining the absolute maximum of said $S(\omega)$ in the range $0 \leq \omega \leq \pi$ and for generating an equipment error alarm when said absolute maximum occurs at $\omega = 0$.

2. A monitor as set forth in claim 1 in which said third means includes fifth means for determining the time during which a value of said $S(\omega)$ exceeding a predetermined threshold persists, and for generating an equipment error alarm whether said time exceeds a predetermined time duration.

3. An error monitor for a localizer of an instrument landing system comprising:

first means for continuously determining at said monitor the difference in depth of modulation of the 90 and 150 Hz modulations and for identifying values of said difference in excess of a predetermined value, and means for producing a frequency spectrum of said difference in depth of modulation as a time function;

second means responsive to a determination of said difference in depths of modulation exceeding said predetermined value;

third means activated by said excess determination in said second means, for determining at least a typical characteristic of said frequency spectrum;

fourth means storing selected instantaneous values of a frequency spectrum function representative of a reference condition corresponding to one of an equipment error spectrum and a non-equipment error spectrum;

and fifth means for comparing the determination of said third means with corresponding stored values in said fourth means to determine the presence of an equipment error.

* * * * *